(12) United States Patent
Hashimoto

(10) Patent No.: US 7,031,087 B2
(45) Date of Patent: Apr. 18, 2006

(54) SERVO WRITER

(75) Inventor: Akihiro Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 103 days.

(21) Appl. No.: 10/428,127

(22) Filed: May 2, 2003

(65) Prior Publication Data

US 2003/0206359 A1 Nov. 6, 2003

(30) Foreign Application Priority Data

May 2, 2002 (JP) .............................. 2002-130635

(51) Int. Cl.
*G11B 5/09* (2006.01)
*G11B 21/02* (2006.01)

(52) U.S. Cl. .......................................... 360/53; 360/75

(58) Field of Classification Search ................. 360/53, 360/75, 77.12, 46
See application file for complete search history.

(56) References Cited

U.S. PATENT DOCUMENTS

| 5,101,309 A * | 3/1992 | Mitsuhashi ................... 360/68 |
| 6,738,210 B1 * | 5/2004 | Olson et al. ................... 360/53 |
| 6,754,026 B1 * | 6/2004 | Koski ....................... 360/73.04 |
| 2004/0109257 A1 * | 6/2004 | Beck et al. ................... 360/76 |

* cited by examiner

*Primary Examiner*—David Hudspeth
*Assistant Examiner*—Varsha A. Kapadia
(74) *Attorney, Agent, or Firm*—Sughrue Mion, PLLC

(57) ABSTRACT

Object of this invention is to provide a servo writer capable of automatically controlling record current amount supplied to a writing head for every kind of magnetic tape when writing a servo signal on many kinds of magnetic tapes. The servo writer for writing a servo signal on magnetic tape MT which is fed out from a feeding reel and taken-up by a take-up reel includes writing head H1 that writes a servo signal on the magnetic tape MT, inspection head H2 for reading the servo signal formed on the downstream side and written on the magnetic tape MT, servo signal inspection part 16 that inspects the servo signal read by the inspection head H2, and current amount control part 17 that controls the amount of record current supplied to the writing head H1 based on the inspection result in the servo signal inspection part 16.

8 Claims, 5 Drawing Sheets

SERVO WRITER

TECHNICAL FIELD OF THE INVENTION

The present invention relates to a servo writer for writing a servo signal on magnetic tapes.

BACKGROUND OF THE INVENTION

Conventionally, the magnetic tape is widely used as a recording medium for recording/reproducing data. As shown in FIG. 4, magnetic tape MT includes many data tracks DT where data is recorded formed in the width direction (the vertical direction in the drawing) of the magnetic tape MT in order to heighten storage density per unit area. In FIG. 4, four data tracks DT are formed. In addition, although not shown, the data tracks are subdivided by further two or more tracks, respectively. And in recent years, in order to make storage density per unit area still higher, width of each data track DT is narrowed and the number of the data tracks DT is increased.

However, when width of the data tracks DT is narrowed, minute movement of the magnetic tape MT in the width direction is repeated for various reasons during traveling. Therefore, it becomes difficult for magnetic disk recording and reproducing head (not shown) to trace the data track DT completely at the time of record/reproduction of data. So, in this kind of device that records/reproduces the magnetic tape for high-density record, the position of the magnetic disk recording and reproducing head to magnetic tape is dynamically controlled on the basis of the servo signal written on the magnetic tape beforehand at the time of record/reproduction of data. Namely, the servo signal is read by the magnetic disk recording and reproducing head, which is integrally formed with recording/reproducing head, and position offset of the magnetic disk recording and reproducing head in the width direction of the magnetic tape is detected, and the magnetic disk recording and reproducing head is moved so that this position offset may be corrected. In addition, the servo signal is written by the servo writer of exclusive use along the run direction (the direction of arrow A in the drawing) of the magnetic tape MT beforehand. In FIG. 4, four servo tracks ST are formed.

FIG. 5 is a conceptional view in elevation showing the conventional servo writer. As shown in FIG. 5, the conventional servo writer 20 includes feeding reel 21 that feeds out the magnetic tape MT where the servo signal is not written, writing head H1 that writes the servo signal on the magnetic tape MT fed out from the feeding reel 21, inspection head H2 formed on the downstream side of the writing head H1, and reads the servo signal written on the magnetic tape MT for inspection, and take-up reel 22 which takes up the magnetic tape MT in which the servo signal is written. Moreover, signs 23 and 24 are the capstan rollers that cause the magnetic tape MT run.

In the conventional servo writer 20 constituted as described above, the servo signal is written on the magnetic tape MT by supplying record current, which is a writing signal of servo pattern and by giving magnetism to the predetermined part of the magnetic tape MT. To be explained in detail, magnetism is given to the predetermined part of the magnetic tape MT by the writing head H1, and a predetermined part is magnetized, to thereby the servo pattern is formed on the magnetic tape MT. In addition, since the magnetic tape of the same kind is manufactured for a long period of time, the magnetic tapes of many kinds exist at the same period. Therefore, generally writing a servo signal on the magnetic tapes of many kinds by one set of a servo writer is performed.

If there are too few amounts of record current supplied to the writing head H1 in case a servo signal is written on magnetic tape MT, the predetermined part of magnetic tape MT is not fully magnetized. Therefore, correct writing of the servo signal is not allowed. Moreover, if the amount of record current supplied to the writing head H1 is too large, the area beyond necessity is magnetized. Therefore, correct recording of the servo signal is not allowed. In addition, the thickness of a magnetic layer and the anti-magnetism of the magnetic layer change according to the kinds of the magnetic tape MT. The ranges of the amount of record current capable of writing the servo signal correctly differ for every kind of the magnetic tape MT. Therefore, in order to write the servo signal on the magnetic tape MT correctly, it is necessary to adjust the amount of record current supplied to the writing head H1 for every kind of the magnetic tape MT.

However, in the conventional servo writer 20 as shown in FIG. 5, when writing the servo signal in many kinds of magnetic tape MT, the amount of record current of the writing head H1 has to be adjusted by manual handling one by one for every kind of the magnetic tape MT. Therefore, low efficiency is caused.

SUMMARY OF THE INVENTION

This invention is proposed in order to overcome the above-described problem, and the object of this invention is to provide a servo writer capable of adjusting automatically the amount of record current supplied to a writing head for every kind of magnetic tape, in case of writing of a servo signal on many kinds of magnetic tapes.

The servo writer of this invention is a servo writer for writing a servo signal on magnetic tape that is sent out from a feeding reel and taken up by a take-up reel, the servo writer comprising:

a writing head that writes a servo signal on the magnetic tape;

an inspection head that reads the servo signal formed on the downstream side of the writing head and written on the magnetic tape for inspection;

a servo signal inspection part that inspects the servo signal read by the inspection head; and a current amount control part that controls the amount of record current supplied to the writing head based on the inspection result in the servo signal inspection part. In addition, a "downstream side" means the side of the downstream in the run direction of the magnetic tape.

According to the servo writer thus constituted, the servo signal inspection part inspects a servo signal read by the inspection head and the current amount control part controls the amount of record current supplied to the writing head based on the inspection result so as to be suitable. Thereby, the amount of record current supplied to the writing head can be adjusted automatically.

Moreover, the current control part may be constituted so as to control the amount of record current supplied to the writing head based on the value obtained by the moving average processing of the output of the servo signal read by the inspection head.

With this constitution, the record current can be stabilized reliably for a short time, without being influenced by fine change of the output of the servo signal read by the inspection head.

PREFERRED EMBODIMENT OF THE INVENTION

Hereafter, with reference to the attached drawings, the embodiment of this invention will be explained in detail.

A servo writer according to the embodiment of this invention is applicable to various kinds of magnetic tapes. However, the embodiment is characterized in that the servo signal is recorded on the magnetic tape, wherein the magnetic tape is used for a tape device which is used as an external storage device of a computer, and the servo signal is used when a servo control of the recording/reproducing head is performed. This is taken as an example.

Figure 1:
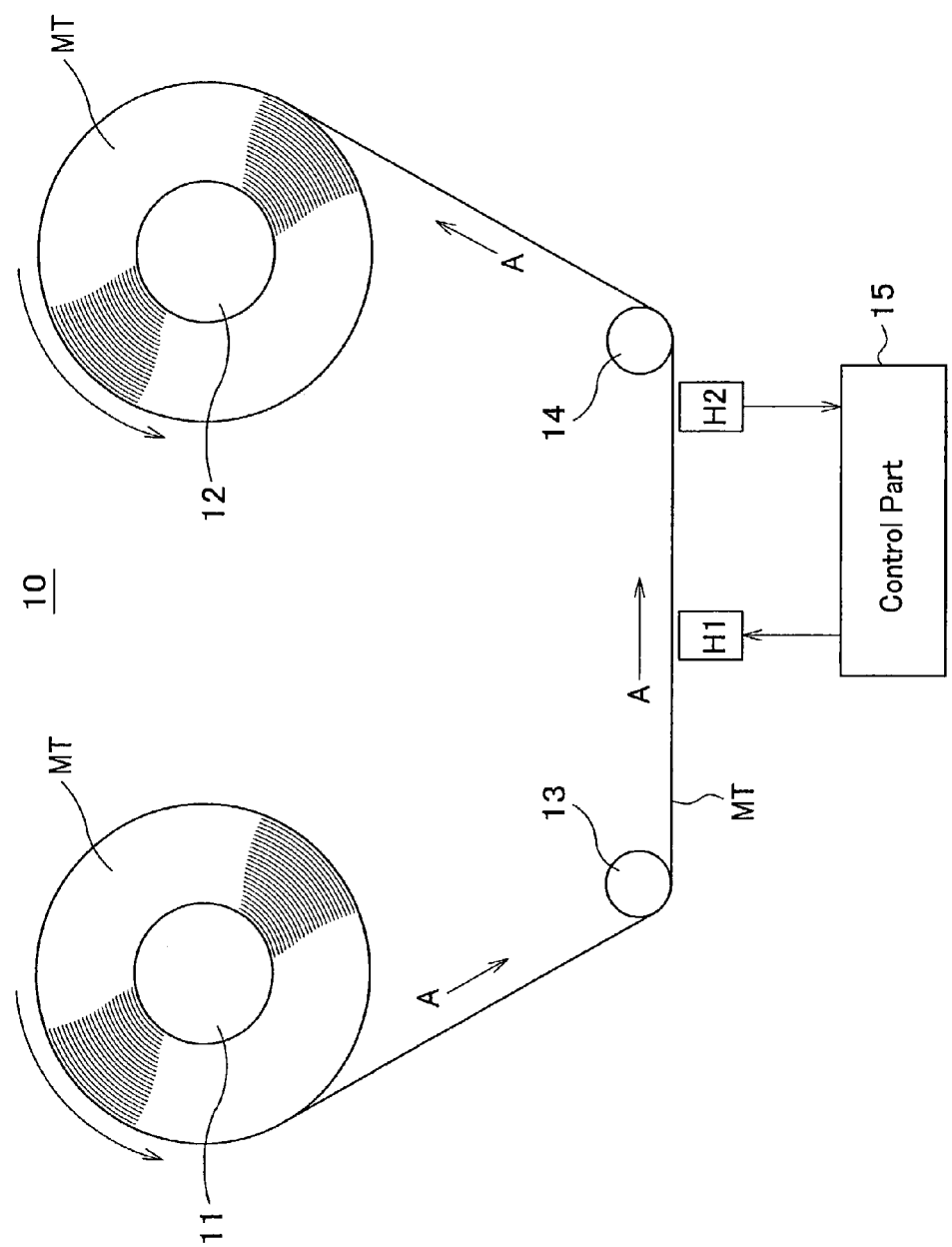
FIG. 1 is a conceptional front view showing a servo writer according to this invention.
Figure 2:
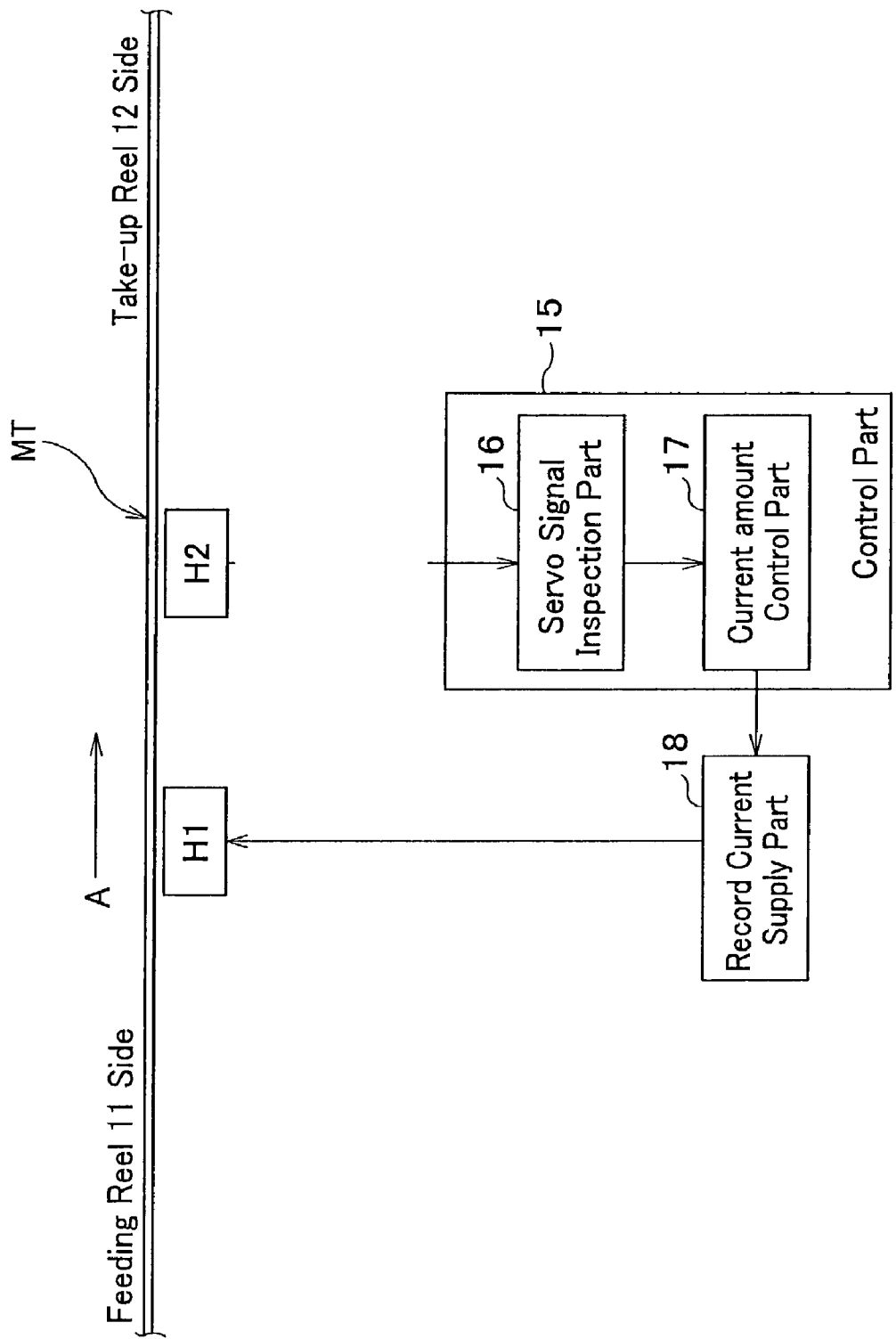
FIG. 2 is a block diagram showing a substantial constitution of the servo writer according to the embodiment of this invention.
Figure 3:
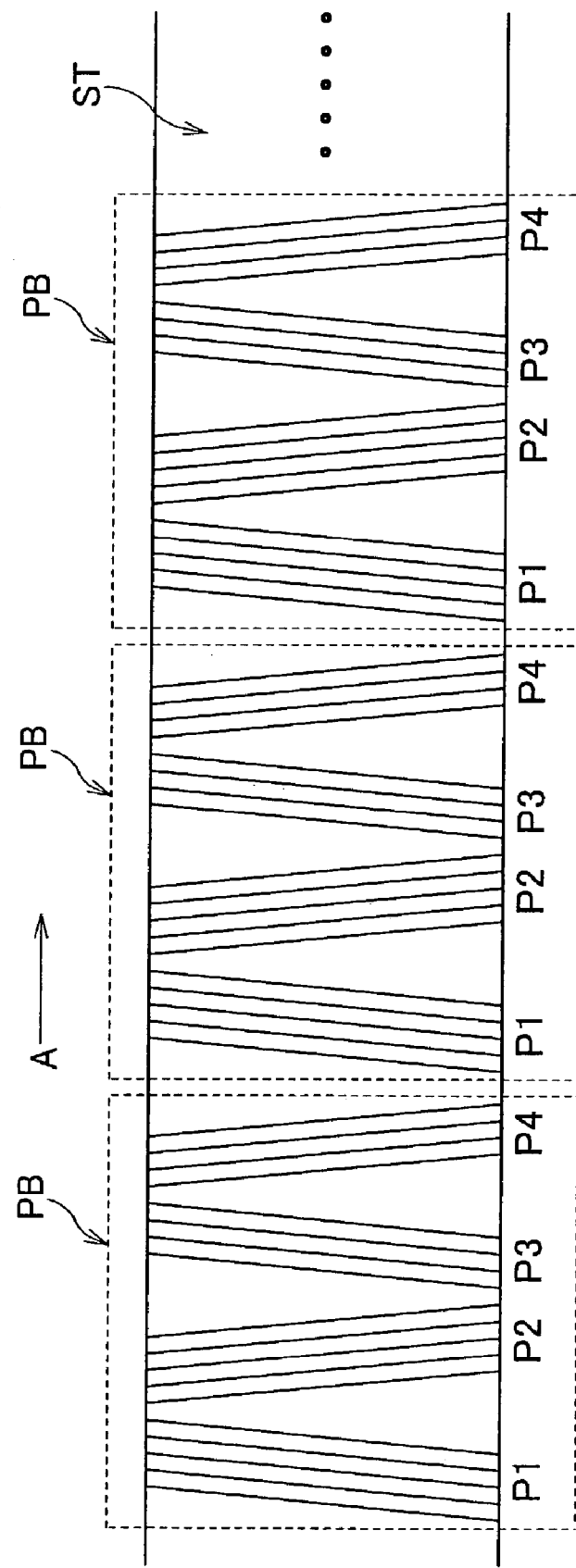
FIG. 3 is a front view showing the constitution of a servo signal.

First, the constitution of a servo writer will be explained. FIG. 1 is a conceptional front view showing a servo writer according to the embodiment of this invention. FIG. 2 is a block diagram showing the constitution of the outline of the servo writer according to the embodiment of this invention. FIG. 3 is a plan view showing the constitution of a servo signal.

As shown in FIG. 1, servo writer 10 includes feeding reel 11 and take-up reel 12, and between the feeding reel 11 and the take-up reel 12, writing head H1 and inspection head H2 are arranged in order. The writing head H1 is connected to record current supply part 18, and the inspection head H2 is connected to control part 15.

The feeding reel 11 is arranged on the upstream side of the writing head H1, and the magnetic tape MT in which the servo signal is not written is wound on the outer circumference. The feeding reel 11 is rotated at predetermined number of rotations by a servo motor which is not shown, to thereby feeds the magnetic tape MT which is wound on the outer circumference toward the writing head H1 at predetermined rate. In addition, an "upstream side" here means the upstream side in the run direction of the magnetic tape MT.

The take-up reel 12 is arranged on the downstream side of the inspection head H2. By rotating at predetermined number of rotations by the servo motor which is not shown, the magnetic tape MT in which the servo signal is written by the writing head H1 is taken up at predetermined rate, and is wound on the outer circumference. In addition, the "downstream side" here means the downstream in the run direction of the magnetic tape MT.

Moreover, capstan roller 13 is arranged on the upstream side of the writing head H1, and capstan roller 14 is arranged on the downstream side of the inspection head H2, respectively. The magnetic tape MT runs also by rotation of the capstan rollers 13 and 14. Namely, the magnetic tape MT fed out from the feeding reel 11 runs in the direction of arrow A in the drawing by rotation of the servo motor which is not shown and the capstan rollers 13 and 14, while being guided by pluralities of guide rollers which are not shown.

In addition, in order to write a servo signal on magnetic tape MT correctly, it is required for the servo writer 10 to make the magnetic tape MT into proper tension, or to make the magnetic tape MT run at predetermined rate. Therefore, although not shown in FIG. 1, the servo writer 10 includes a tape tension control part that adjust the tension of the magnetic tape MT to be suitable, and a tape run control part that controls rotation of the servo motor and the capstan rollers 13 and 14 so that the magnetic tape MT runs at predetermined rate.

As shown in FIG. 2, the writing head H1 and the inspection head H2 conduct a writing of the servo signal on the magnetic tape MT, and a reading of the servo signal written on the magnetic tape MT by being controlled by the control part 15.

Figure 4:
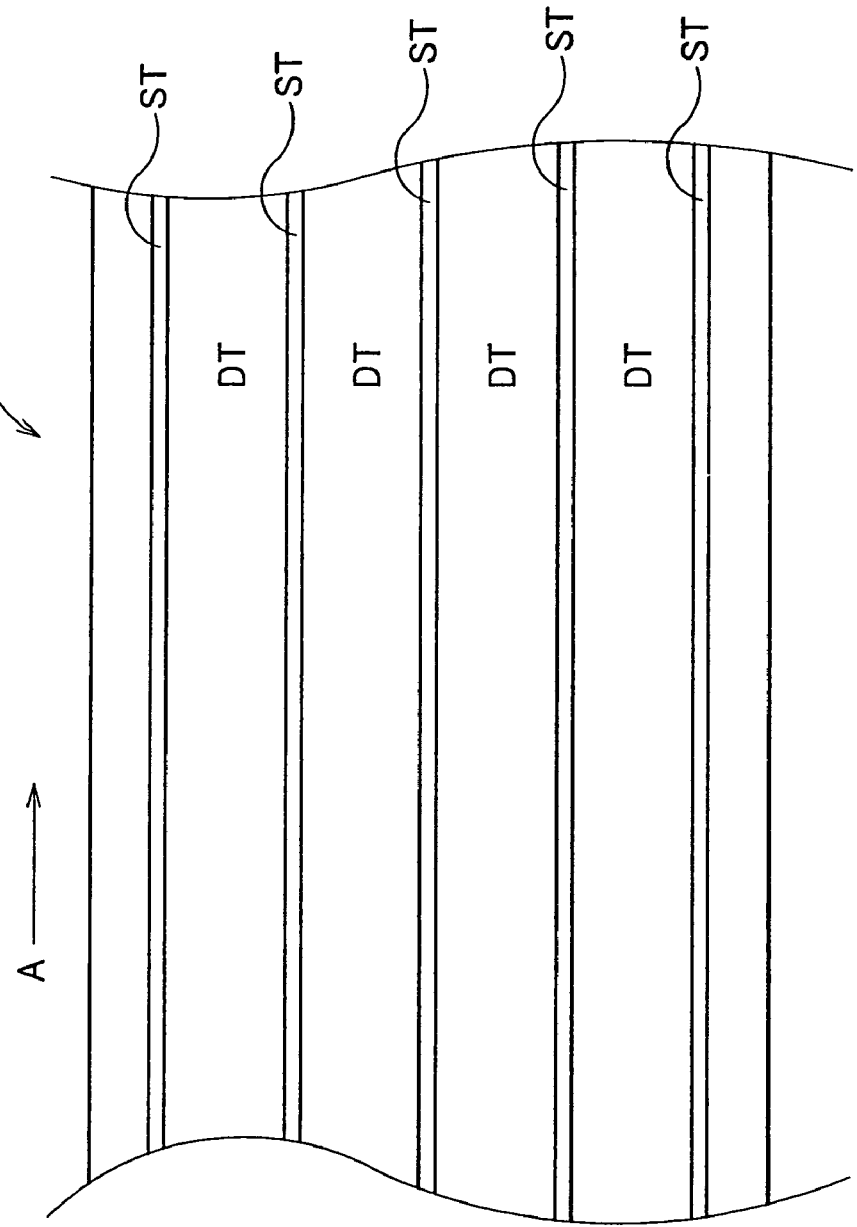
FIG. 4 is a front view showing a track constitution of magnetic tape.
Figure 5:
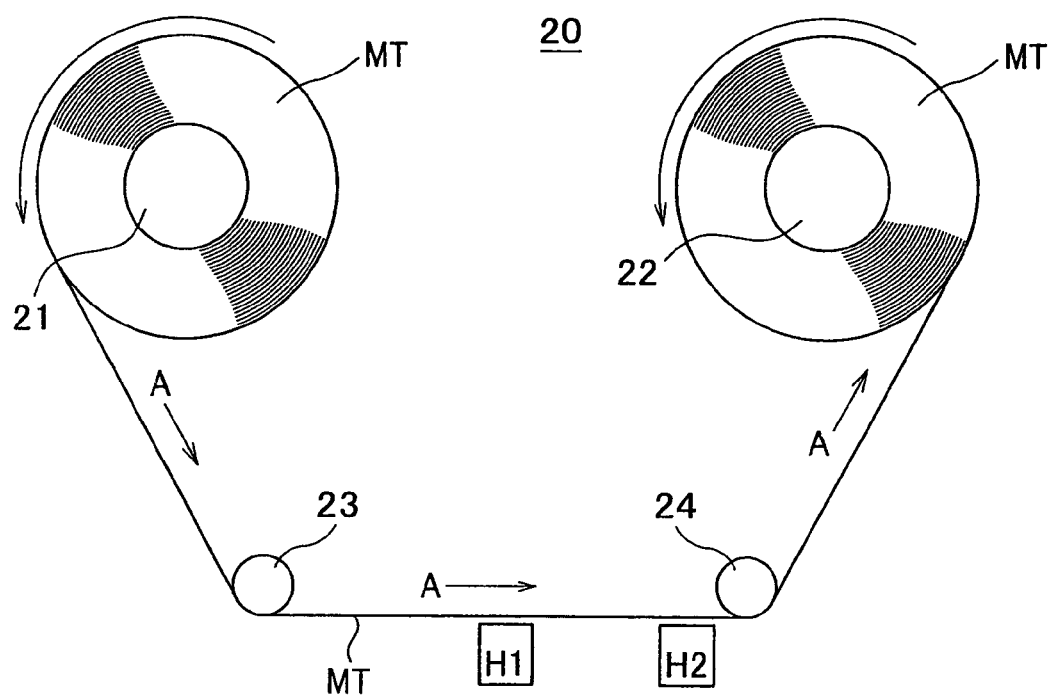
FIG. 5 is a conceptional front view showing the conventional servo writer.

The writing head H1 writes the servo signal of the predetermined pattern supplied from the control part 15 on the magnetic tape MT (see FIG. 4). The servo signal is a standard signal of special pattern written along the run direction of the magnetic tape MT, and as shown in FIG. 3, pattern block PB is formed by patterns P1 to P4 which are inclined at a predetermined angle to the run direction (the direction of arrow A in the drawing) of the magnetic tape MT, respectively. The servo signal forms the servo track ST by writing the pattern block PB repeatedly along the run direction of the magnetic tape MT.

The inspection head H2 reads the servo signal written on the magnetic tape MT. The servo signal read by the inspection head H2 is outputted to the output inspection part 16 of the control part 15 as will be described hereafter.

The control part 15 includes servo signal inspection part 16 and current amount control part 17 as shown in FIG. 2. The control part 15 is constituted by a computer (a microcomputer is included) that has CPU, ROM, RAM, I/O, etc.

The servo signal inspection part 16 inspects the servo signal read by the inspection head H2. Specifically, the servo signal read by the inspection head H2 is compared with the servo signal memorized by the servo signal memory part which is not shown, to thereby inspect the existence of the abnormalities (record error) of the servo signal. In addition, the record error has two patterns, which are the case where the pattern that forms a servo signal is missing, and the case where unnecessary pattern that is not included in the correct servo signal is written. The causative factor of the record errors is considered to be the unsuitable amount of record current supplied to the writing head H1. The inspection result in the servo signal inspection part 16 is outputted to the current amount control part 17.

The current amount control part 17 controls the record current supply part 18 so that the amount of record current supplied to the writing head H1 becomes suitable based on the inspection result in the servo signal inspection part 16. When it is judged that there are specifically too few amounts of record current supplied to the writing head H1, the amount of record current supplied to the writing head H1 from the record current supply part 18 is made to increase. Also, when it is judged that there are too many amounts of record current supplied to the writing head H1, the amount of record current supplied to the writing head H1 from the record current supply part 18 is decreased. Increase amount and reduction amount of the record current are determined based on the inspection result in the servo signal inspection part 16.

Next, operation of the servo writer 10 constituted as described above will be explained.

First, the record current which is a writing signal of a predetermined servo pattern is supplied to the writing head H1 from the record current supply part 18 and magnetism is outputted from the writing head H1, to thereby write the servo signal on the magnetic tape (see FIG. 4).

Then, the servo signal written on the magnetic tape MT is read by the inspection head H2. The servo signal read by the inspection head H2 is outputted to the servo signal inspection part 16 of the control part 15, to be inspected in the servo signal inspection part 16. The inspection result in the servo signal inspection part 16 is outputted to the current amount control part 17.

The record current supply part 18 is controlled by the current amount control part 17 so that the amount of the record current supplied to the writing head H1 becomes suitable based on the inspection result in the servo signal inspection part 16. Specifically, when it is judged that there are specifically too few amounts of record current supplied to the writing head H1, the amount of record current supplied to the writing head H1 from the record current supply part 18 is decreased. Moreover, when it is judged that there are too many amounts of record current supplied to the writing head H1, the amount of record current supplied to the writing head H1 from the record current supply part 18 is made to increase.

And the amount of record current is supplied to the writing head H1 from the record current supply part 18, and magnetism is outputted from the writing head H1, to thereby write the servo signal on the magnetic tape.

According to servo writer 10 thus constituted, the servo signal inspection part 16 is read by the inspection head H2, and inspects the servo signal. Based on the inspection result, the current amount control part 16 controls the record current supply part 18 so that the amount of the record current for supplying to the writing head H1 may be suitable, to thereby adjust the record current amount automatically.

Therefore, when the servo signal is written on many kinds of the magnetic tapes MT in the servo writer 10, the record current amount supplied to the writing head for every kind of magnetic tape can be adjusted automatically, therefore the servo signal can be correctly written on the magnetic tape.

As described above there is shown a preferred embodiment of the invention, but the invention is not construed as being limited thereto and may be modified changed, substituted without departing from the technical spirit and scope of the invention.

For example, the current control part 17 may be formed so that the amount of record current supplied to the writing head H1 may be controlled based on the value obtained by the moving average processing of the output of the servo signal read by the inspection head H2.

With this constitution, record current can be stabilized reliably for a short time, without being influenced by fine change of the output of the servo signal read by the inspection head H2.

Moreover, the servo signal inspection part 16 may also be formed so that the size of the output of the servo signal read by the inspection head H2 may be inspected. In this case, based on the inspection result in the servo signal inspection part 16, the current amount control part 17 does not change the amount of the record current when it is judged that the output of the servo signal is enough, and when it is judged that the output of the servo signal is inadequate, the amount of the record current is made to be increased. Increase amount of the record current is determined based on the inspection result in the servo signal inspection part 16.

What is claimed is:

1. A servo writer for writing a servo signal on a magnetic tape which is fed out from a feeding reel and taken-up by a take-up reel, the servo writer comprising:
    a writing head that writes a servo signal on the magnetic tape;
    an inspection head which is formed on the downstream side of the writing head and reads the servo signal written on the magnetic tape for inspection;
    a servo signal inspection part that inspects the servo signal read by the inspection head; and
    a current amount control part that controls an amount of a record current supplied to the writing head based on the inspection result in the servo inspection part;
    wherein based on a value obtained by moving average processing of the output of the servo signal read by the inspection head, the existence of the writing error of the servo signal written on the magnetic tape is inspected, and
    wherein the servo signal read by the inspection head and a reference servo signal are compared, to thereby inspect the existence of a writing error of the servo signal written on the magnetic tape.

2. A servo writer as described in claim 1, comprising a tape tension control part that adjusts the tension of the magnetic tape, and a tape run control part that controls rotation of the servo motor.

3. A servo writer as described in claim 1, wherein a servo signal is formed by patterns which are inclined at a predetermined angle to the run direction of the magnetic tape.

4. The servo writer of claim 1, wherein the moving average processing comprises an average of outputs of multiple servo signals recorded to the tape.

5. The servo writer of claim 1, wherein the current amount control part automatically adjusts the record current to the writing head for different magnetic tapes.

6. A method for writing a servo signal that is fed out from a feeding reel and writes the servo signal on a magnetic tape taken up on a take-up reel, comprising the steps of:
    writing the servo signal on the magnetic tape by a writing head;
    reading a servo signal written on the magnetic tape for inspection by an inspection head;
    inspecting the servo signal read by the reading step; and
    controlling an amount of a record current supplied to the writing head based on the inspection result by the inspection step;
    wherein based on a value obtained by moving average processing of the output of the servo signal read by the inspection head, the existence of the writing error of the servo signal written on the magnetic tape is inspected, and
    wherein the servo signal read by the reading step and the reference servo signal are compared, to thereby the existence of the writing error of the servo signal written on the magnetic tape is inspected.

7. A method for writing a servo signal by the servo writer as described in claim 6, further comprising adjusting the tension of the magnetic tape and controlling rotation of the servo motor.

8. A method for writing a servo signal by the servo writer as described in claim 6, wherein a servo signal is formed by patterns which are inclined at a predetermined angle to the run direction of the magnetic tape.

* * * * *